(12) United States Patent
Mizuguchi

(10) Patent No.: US 10,647,532 B2
(45) Date of Patent: May 12, 2020

(54) SHEET STORING CASSETTE AND IMAGE FORMING APPARATUS THEREWITH

(71) Applicant: KYOCERA Document Solutions Inc., Osaka (JP)

(72) Inventor: Keisuke Mizuguchi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/225,524

(22) Filed: Dec. 19, 2018

(65) Prior Publication Data

US 2019/0218046 A1 Jul. 18, 2019

(30) Foreign Application Priority Data

Jan. 17, 2018 (JP) ................. 2018-005352

(51) Int. Cl.
| | |
|---|---|
| *B65H 1/04* | (2006.01) |
| *B65H 1/26* | (2006.01) |
| *G03G 15/00* | (2006.01) |
| *H04N 1/00* | (2006.01) |
| *G03G 21/16* | (2006.01) |

(52) U.S. Cl.
CPC ............... *B65H 1/04* (2013.01); *B65H 1/266* (2013.01); *G03G 15/6502* (2013.01); *G03G 21/1647* (2013.01); *H04N 1/0066* (2013.01); *B65H 2402/64* (2013.01); *B65H 2405/1122* (2013.01); *B65H 2405/121* (2013.01); *B65H 2511/11* (2013.01)

(58) Field of Classification Search
CPC ........ B65H 1/00; B65H 1/04; B65H 2402/64; B65H 2405/112; B65H 2405/1122; B65H 2405/114; B65H 2405/12; B65H 2405/121; B65H 2511/00; B65H 2511/10; B65H 2511/11
See application file for complete search history.

(56) References Cited

U.S. PATENT DOCUMENTS 5,632,477 A * 5/1997 Morinaga ................ B65H 1/08
271/127
2009/0295073 A1* 12/2009 Furusawa .............. B65H 1/266
271/171

(Continued)

FOREIGN PATENT DOCUMENTS

JP 2009-23756 A 2/2009

*Primary Examiner* — Prasad V Gokhale
(74) *Attorney, Agent, or Firm* — Stein IP, LLC

(57) ABSTRACT

A sheet storing cassette includes a cassette base, a sheet stacking plate, a cursor rail, a regulation cursor, and an adjustment member. The regulation cursor has a first regulating portion which forms a first sheet regulating face for positioning the sheets placed on the sheet stacking plate in the sheet feeding direction. The cursor rail has a plurality of engaged portions with which an engaging portion provided on the regulation cursor meshes when the regulation cursor is moved such that the first sheet regulating face is arranged at standard-size positions corresponding to a standard-size sheet. The adjustment member has a second regulating portion that offsets, when the adjustment member is attached to the regulation cursor arranged at one of standard-size positions, the first sheet regulating face to a second sheet regulating face corresponding to a non-standard size sheet.

10 Claims, 8 Drawing Sheets

(56) References Cited

U.S. PATENT DOCUMENTS

| | | | |
|---|---|---|---|
| 2016/0096699 A1* | 4/2016 | Wada | B65H 1/04 271/109 |
| 2016/0200531 A1* | 7/2016 | Ishida | B65H 1/266 271/171 |
| 2017/0255153 A1* | 9/2017 | Eguchi | B65H 3/66 |
| 2019/0300306 A1* | 10/2019 | Fuse | B65H 1/266 |
| 2019/0366745 A1* | 12/2019 | Daniels | B65H 1/04 |

* cited by examiner

SHEET STORING CASSETTE AND IMAGE FORMING APPARATUS THEREWITH

INCORPORATION BY REFERENCE

This application is based upon and claims the benefit of priority from the corresponding Japanese Patent Application No. 2018-005352 filed on Jan. 17, 2018, the entire contents of which are incorporated herein by reference.

BACKGROUND

The present disclosure relates to a sheet storing cassette for storing a recording medium in sheet form such as sheets, for use in copiers, printers, facsimile machines, and multi-function peripherals incorporating their functions, and also relates to image forming apparatuses provided with a sheet storing cassette.

In conventionally common image forming apparatuses, a sheet feeding cassette for storing a plurality of sheets is drawably provided in a bottom portion of the apparatus main body. Such an image forming apparatus, with a separating-conveying means comprising a pick-up roller and the like arranged above the sheet feeding cassette, sends out sheets stored in the sheet feeding cassette one sheet after another and conveys them to an image forming portion and a fixing portion with a conveying roller to form an image on each sheet.

In the sheet feeding cassette, there are arranged cursor members comprising a width aligning cursor for positioning sheets in the width direction and a rear end cursor for positioning sheets in the sheet feeding direction. By moving these cursor members according to the size of stacked sheets, the user positions sheets at a predetermined position (sheet feeding position) in the sheet feeding cassette. Here, if the cursor member moves after sheets are positioned, the sheets may shift from the sheet feeding position, and a sheet feeding failure such as a skewed sheet or a missed sheet may occur.

Thus, there have been proposed methods for preventing unintended movement of the cursor member. For example, in one known sheet feeding cassette, there are provided a sheet stacking plate that is pivotable about a pivot as the center, a movable cursor for aligning the sheets placed on the sheet stacking plate, and a cursor lever with a locking portion for locking the movement of the cursor, and when the cursor lever is tilted toward the moving direction of the cursor, the cursor is unlocked.

SUMMARY

According to one aspect of the present disclosure, a sheet storing cassette includes a cassette base, a sheet stacking plate, a cursor rail, a regulation cursor, and an adjustment member. The cassette base can be inserted in and drawn out from an apparatus main body and stores sheets. An end part of the sheet stacking plate, on the upstream side in a sheet feeding direction, is pivotably supported on a bottom face of the cassette base and sheets are placed on the top face of the sheet stacking plate. The cursor rail is on the bottom face of the cassette base and extends along the sheet feeding direction. The regulation cursor is provided movably along the cursor rail and has an engagement portion and a first regulating portion which forms a first sheet regulating face for positioning the sheet placed on the sheet stacking plate in the sheet feeding direction. The cursor rail has a plurality of engaged portions which are provided at standard-size positions corresponding to a plurality of standard sheet sizes in the cursor rail to mesh with the engaging portion when the regulation cursor is arranged at one of the standard-size positions. The adjustment member is attachable to and removable from the regulation cursor and has a second regulating portion that offsets, when the adjustment member is attached to the regulation cursor arranged at one of the standard-size positions, the first sheet regulating face to a second sheet regulating face corresponding to a non-standard size sheet smaller, in the sheet feeding direction, than a standard size corresponding to the one of the standard-size positions.

This and other objects of the present disclosure, and the specific benefits obtained according to the present disclosure, will become apparent from the description of embodiments which follows.

DETAILED DESCRIPTION

Figure 1:
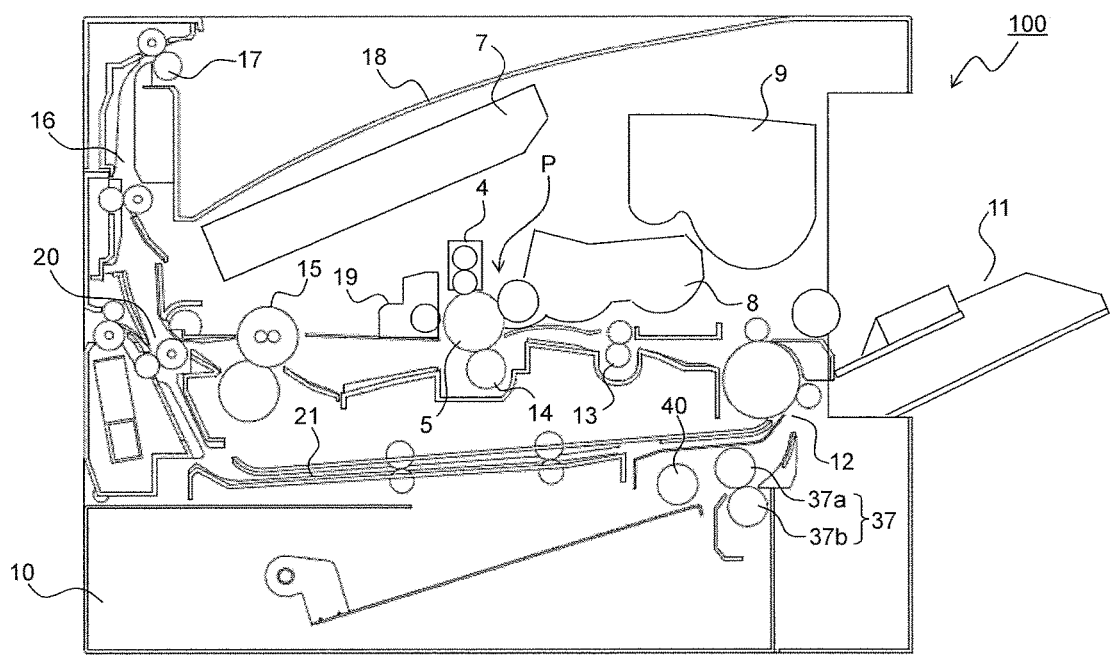
FIG. 1 is a cross-sectional side view showing the internal structure of an image forming apparatus mounted with a sheet feeding cassette according to one embodiment of the present disclosure.

Hereinafter, with reference to the accompanying drawings, embodiments of the present disclosure will be described. FIG. 1 is a cross-sectional side view showing the internal structure of an image forming apparatus 100 mounted with a sheet feeding cassette 10 according to one embodiment of the present disclosure. Inside the image forming apparatus (for example, a monochrome printer) 100, there is arranged an image forming portion P that forms a monochrome image through processes of charging, exposure, development, and transfer. In the image forming portion P, there are arranged, along the rotating direction of a photosensitive drum 5 (in the clockwise direction in FIG. 1), a charging unit 4, an exposure unit (for example, a laser scanning unit) 7, a developing unit 8, a transfer roller 14, a cleaning device 19, and a static eliminator (unillustrated).

When image forming operation is performed, the charging unit 4 electrostatically charges the surface of the photosensitive drum 5 uniformly which rotates in the clockwise direction. Then, with a laser beam from the exposure unit 7 based on document image data, an electrostatic latent image is formed on the photosensitive drum 5, and developer (hereinafter called toner) is attached to the electrostatic latent image by the developing unit 8 to form a toner image.

Toner is fed to the developing unit 8 from a toner container 9. Image data is transmitted from a personal computer (unillustrated) or the like. A static eliminator (unillustrated) that removes residual electric charges on the surface of the photosensitive drum 5 is provided on the downstream side of a cleaning device 19.

Toward the photosensitive drum 5, where a toner image has now been formed as described above, a sheet is conveyed from a sheet feeding cassette 10 or a manual sheet feeding device 11 through a sheet conveying passage 12 via a registration roller pair 13, and the toner image formed on the surface of the photosensitive drum 5 is transferred to the sheet by a transfer roller 14 (an image transfer portion). The sheet having the toner image transferred to it is separated from the photosensitive drum 5, and is conveyed to a fixing device 15, where the toner image is fixed. The sheet having passed through the fixing device 15 is conveyed to an upper part of the image forming apparatus 100 through a sheet conveying passage 16, and when an image is formed on only one side of the sheet (during one-sided printing), the sheet is discharged to a discharge tray 18 by a discharge roller pair 17.

On the other hand, when images are formed on both sides of a sheet (during double-sided printing), after the trailing edge of the sheet passes a branch portion 20 of the sheet conveying passage 16, the conveying direction is reversed. With this, the sheet is directed to a reversing conveying passage 21 that branches from the branch portion 20, and is conveyed again to the registration roller pair 13 with the image face reversed. Then, the next toner image formed on the photosensitive drum 5 is transferred to the face on which no image has yet been formed by the transfer roller 14. The sheet having the toner image transferred to it is conveyed to the fixing device 15 to have the toner image fixed to it, and is then discharged to the discharge tray 18 by the discharge roller pair 17.

Figure 2:
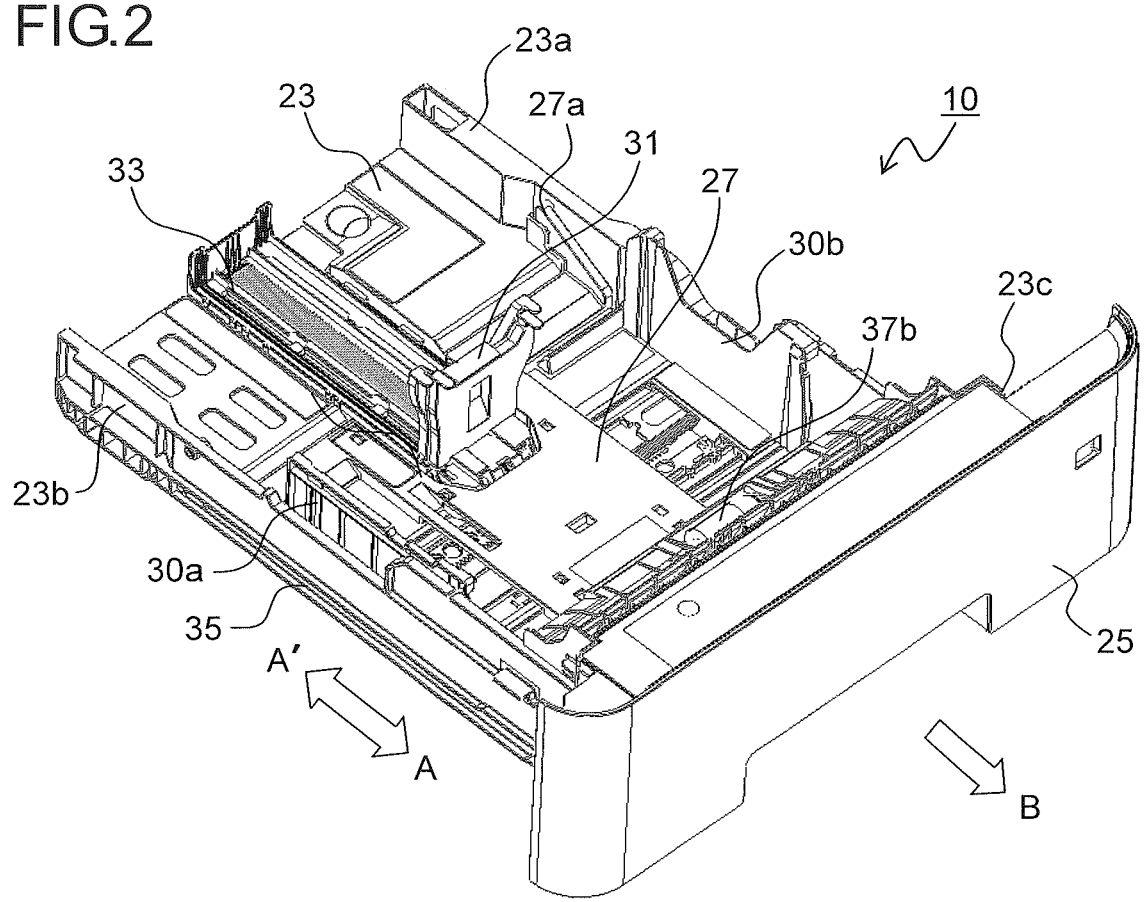
FIG. 2 is a perspective view showing the sheet feeding cassette of the embodiment in a state drawn out of an image forming apparatus main body.

Next, the structure of the sheet feeding cassette 10 will be described. FIG. 2 is a perspective view showing the sheet feeding cassette 10 in a state drawn out of the image forming apparatus 100 main body. In FIG. 2, arrows A and A' indicate the insertion and extraction directions, respectively, of the sheet feeding cassette 10 with respect to the image forming apparatus 100, and an arrow B indicates the sheet feeding direction from the sheet feeding cassette 10.

A cassette base 23 forms a housing of the sheet feeding cassette 10, and is in the shape of a tray with side walls 23a to 23c formed along three sides of its rectangular bottom face respectively. A cassette cover 25 is fitted to the side wall 23c on the downstream side in the insertion direction of the sheet feeding cassette 10. The cassette cover 25, with its obverse side (on the right, near side in FIG. 2) exposed to outside, forms a part of the exterior face of the image forming apparatus 100 (see FIG. 1) main body.

A sheet stacking plate 27 on which sheets are stacked is provided such that an end part of it on the downstream side in the sheet feeding direction (on the right, near side in FIG. 2) can ascend and descend with respect to the bottom face of the cassette base 23 about, as a pivot, swing shafts 27a at the left and right sides on the upstream side (on the left, far side in FIG. 2) in the sheet feeding direction. An end part (pivot end) of the sheet stacking plate 27 on the downstream side in the sheet feeding direction is biased upward by a push-up spring (unillustrated).

On both sides of the sheet stacking plate 27 in its width direction, there is provided a pair of width positioning cursors 30a and 30b for positioning, in the width direction, the sheets stacked on the sheet stacking plate 27 so as to be reciprocatable in the sheet width direction (the direction perpendicular to the arrow B direction in FIG. 2) along a cursor rail (unillustrated) formed on the cassette base 23.

Sheets are fed out toward the sheet conveying passage 12 (see FIG. 1) in the arrow B direction, and thus a rear end cursor (regulation cursor) 31 for aligning the rear ends of the sheets is provided so as to be reciprocatable along the cursor rail 33 formed on the cassette base 23 parallel to the sheet feeding direction (the arrow B direction in the diagram). By moving the width positioning cursors 30a and 30b and the rear end cursor 31 according to the size of the stacked sheets, the sheets are stored at a predetermined position inside the sheet feeding cassette 10. FIG. 2 shows a state where an adjustment member 60 (see FIG. 7) is fitted to the rear end cursor 31.

On the outside of each of the side walls 23a and 23b parallel to the insertion or extraction direction (arrow AA' direction) of the sheet feeding cassette 10, a guide rail 35 is provided. In a cassette insertion portion (unillustrated) in the image forming apparatus 100 main body, there is provided a rail supporting portion (unillustrated) that slidably supports the guide rail 35, and by sliding the guide rail 35 along the rail supporting portion, the sheet feeding cassette 10 can be inserted into and extracted from the image forming apparatus 100 main body.

Near the downstream side of the pivot end of the sheet stacking plate 27 in the sheet feeding direction, there is arranged a retard roller 37b. When the sheet feeding cassette 10 is inserted in the image forming apparatus 100 main body, the retard roller 37b touches a feed roller 37a (see FIG. 1) provided on the image forming apparatus 100 main body. The feed roller 37a and the retard roller 37b constitute the sheet feeding roller pair 37 (see FIG. 1 for both) that separates a plurality of sheets fed out by the pick-up roller 40 and conveys one sheet after another.

Figure 3:
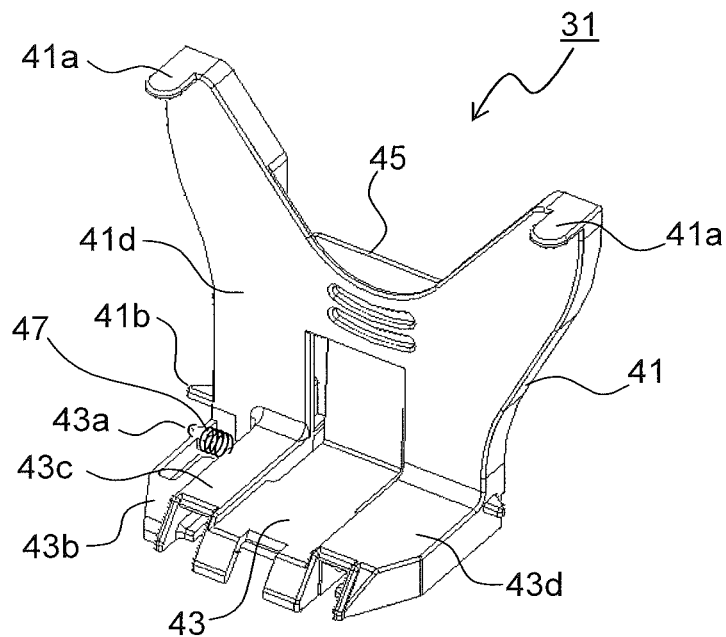
FIG. 3 is a perspective view of a rear end cursor as seen from the downstream side in the sheet feeding direction.
Figure 4:
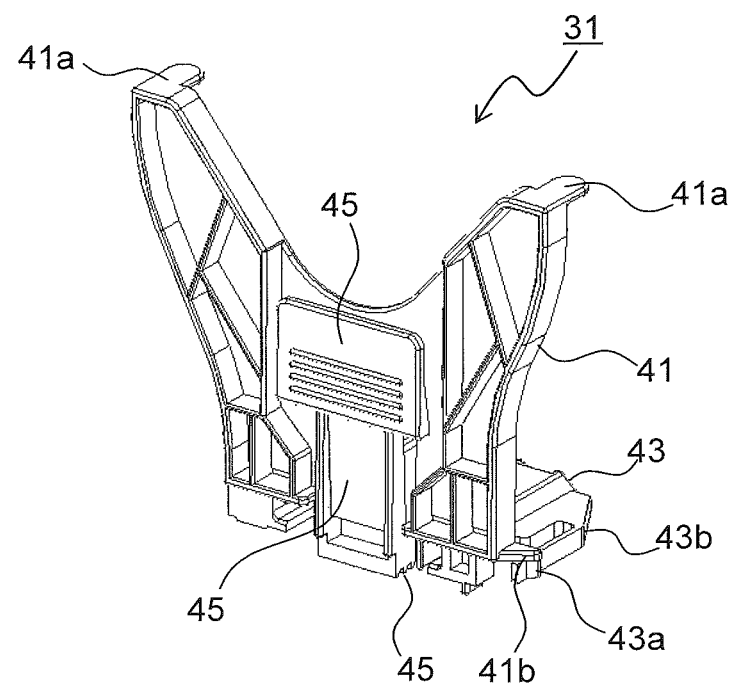
FIG. 4 is a perspective view of the rear end cursor as seen from the upstream side in the sheet feeding direction.
Figure 5:
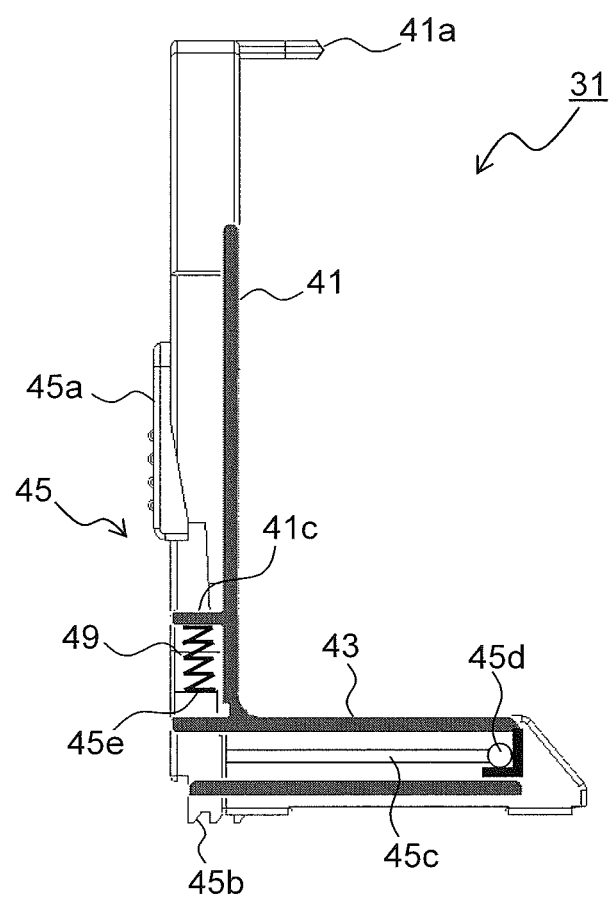
FIG. 5 is a cross-sectional side view of the rear end cursor.

FIGS. 3 and 4 are perspective views of the rear end cursor 31 as seen, respectively, from the downstream side (the front side) and from the upstream side (the rear side) in the sheet feeding direction, and FIG. 5 is a cross-sectional side view of the rear end cursor 31. The rear end cursor 31 includes a first regulating portion 41, a main body portion 43, and a cursor lever 45, and has an L shape as seen in a side view.

The first regulating portion 41 forms a first sheet regulating face 41d that touches the rear-end edge a sheet bundle stacked on the sheet stacking plate 27 and regulates the rear end of the sheets. In an upper end part of the first regulating portion 41, there is formed a first sheet pressing portion 41a that protrudes horizontally toward the downstream side in the sheet feeding direction. When the sheet feeding cassette 10 with a bundle of sheets fully loaded on the sheet stacking plate 27 is inserted, the first sheet pressing portion 41a regulates the sheets so that they do not go over an upper end of the first regulating portion 41 due to an impact during (as a reaction to) the insertion. On a side face of the first regulating portion 41, a size indication arrow 41b is formed. The size indication arrow 41b, when the rear end cursor 31 is arranged at a position corresponding to a standard-size sheet, points to the size indicator (unillustrated) marked on the bottom face of the cassette base 23.

The main body portion 43 extends from a bottom end part of the first regulating portion 41 in the sheet feeding direction. On one side face of the main body portion 43 (on the left side in FIG. 3), an engaging projection 43a (engaging portion) is formed. The engaging projection 43a is cantilever-supported on the main body portion 43 by a supporting portion 43b, and the engaging projection 43a can swing in such a direction as to approach or recede from the main body portion 43. A first coil spring 47 is arranged between the engaging projection 43a and the main body portion 43, and biases the engaging projection 43a in such a direction as to make the engaging projection 43a recede from the main body portion 43. On the top face of the main body portion 43, there are formed projected portions 43c and 43d which extend along the sheet feeding direction.

A cursor lever 45 locks and unlocks the rear end cursor 31 at and from a predetermined position. As shown in FIG. 5, the cursor lever 45 has an operating portion 45a arranged on the rear face side of the first regulating portion 41, a lock claw 45b formed at a lower end part of the operating portion 45a, and an arm portion 45c extending horizontally from the lock claw 45b, and has a pivot 45d provided at a tip end portion of the arm portion 45c. The pivot 45d is arranged between the projected portions 43c and 43d (see FIG. 3) on the main body portion 43.

Between a first spring rest 45e formed in the cursor lever 45 and a second spring rest 41c formed in the first regulating portion 41 above the first spring rest 45e, there is arranged a second coil spring 49. With the second coil spring 49, the cursor lever 45 is biased in such a direction (the counter-clockwise direction in FIG. 5) that the lock claw 45b meshes with rack teeth 50a (see FIG. 6) on the cursor rail 33 about the pivot 45d as the center. FIG. 5 shows a state where the lock claw 45b of the cursor lever 45 meshes with the rack teeth 50a on the cursor rail 33, and the cursor lever 45 is arranged at such a position (locked position) as to regulate the movement of the rear end cursor 31.

Figure 6:
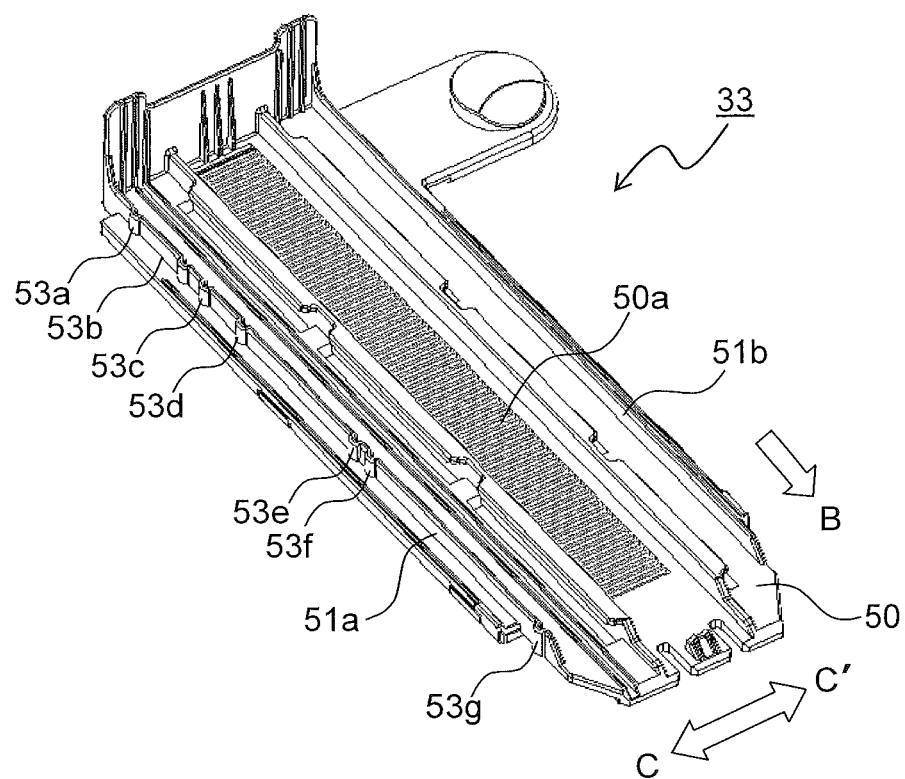
FIG. 6 is a perspective view of a cursor rail that guides the rear end cursor.

FIG. 6 is a perspective view of the cursor rail 33 that guides the rear end cursor 31. The cursor rail 33 has a flat plate-form base portion 50 and guide portions 51a and 51b that are erect on both sides of the base portion 50 in its the width direction (arrow CC' direction) perpendicular to the sheet feeding direction (arrow B direction). On the surface of the base portion 50, there is formed the rack teeth 50a with which the lock claw 45b in the rear end cursor 31 meshes. The guide portions 51a and 51b slidably support the main body portion 43 of the rear end cursor 31 by holding it from both sides in the width direction while restricting its movement in the width direction. The guide portion 51a has engaging depressed portions 53a to 53g (engaged portions) formed so as to be depressed on its inner face side.

A procedure for adjusting the position of the rear end cursor 31 when standard-size sheets are stored in the sheet feeding cassette 10 will now be described. First, from a state in FIG. 5, when, with the first regulating portion 41 side and the cursor lever 45 side of the rear end cursor 31 gripped, the operating portion 45a of the cursor lever 45 is pressed toward the first regulating portion 41 side (in the right direction in FIG. 5), the cursor lever 45 swings about the pivot 45d as the center in the clockwise direction. With this, the lock claw 45b moves up to release the engagement between the lock claw 45b and the rack teeth 50a, and the cursor lever 45 moves to a position (an unlocked position) where it allows the movement of the rear end cursor 31.

Next, with the operating portion 45a of the cursor lever 45 being pressed, the position of the rear end cursor 31 is adjusted according to the size (for example, A4 size or B5 size) of the sheets stored in the sheet feeding cassette 10. Specifically, the rear end cursor 31 is moved along the sheet feeding direction such that the size indication arrow 41b (see FIG. 3) of the rear end cursor 31 points the desired size indicator marked on the bottom face of the cassette base 23.

When the rear end cursor 31 is arranged at a position corresponding to a standard-size sheet, the engaging projection 43a (see FIG. 3) on the main body portion 43 engages with one of the engaging depressed portions 53a to 53g (see FIG. 6) formed on the guide portion 51a. Thus, the feeling of a click (feeling of operation) when the engaging projection 43a engages with the engaging depressed portions 53a to 53g allows a user to easily recognize that the rear end cursor 31 is arranged at a position corresponding to a standard size.

After the position of the rear end cursor 31 is adjusted, when the pressure to the operating portion 45a of the cursor lever 45 is released, the cursor lever 45, with the biasing force from the second coil spring 49, swings about the pivot 45d as the center in the opposite direction (counter-clockwise direction in FIG. 5), and the cursor lever 45 moves to the locked position. With this, the lock claw 45b meshes with the rack teeth 50a, and the rear end cursor 31 is locked at a predetermined position.

On the other hand, the engaging depressed portions 53a to 53g are not arranged at positions corresponding to sheets in sizes other than standard sizes (in non-standard sizes). Thus, when the rear end cursor 31 is arranged at a position corresponding to a non-standard size sheet, even when the rear end cursor 31 is moved, there is no feeling of a click as results when the engaging projection 43a engages with the engaging depressed portions 53a to 53g. As a result, it is difficult to know whether the rear end cursor 31 is positioned at an appropriate position. If sheet feeding is performed with the rear end cursor 31 not arranged at an appropriate position, a sheet feeding failure such as a skewed sheet or a missed sheet occurs.

One possible remedy is adding to the guide portion 51a of the cursor rail 33 engaging depressed portions corresponding to non-standard sizes. However, in the case of a non-standard size smaller, in the sheet feeding direction, than the minimum size (A6 size) of the standard sizes, it is necessary to extend the cursor rail 33 further in the sheet feeding direction. As a result, a cut-off part formed in the sheet stacking plate 27 needs to be made larger according to the moving range of the rear end cursor 31, and the strength of the sheet stacking plate 27 lowers. If engaging depressed portions for non-standard sizes are formed in addition to the engaging depressed portions 53a to 53g, the intervals between the engaging depressed portions become smaller, and thus the rear end cursor 31 is more likely to be arranged at a wrong position.

Thus, this embodiment uses the adjustment member 60 which, when sheets in a non-standard size are set, offsets according to the non-standard size sheets the first sheet regulating face 41d of the rear end cursor 31 arranged at a position corresponding to a standard-size sheet.

Figure 7:
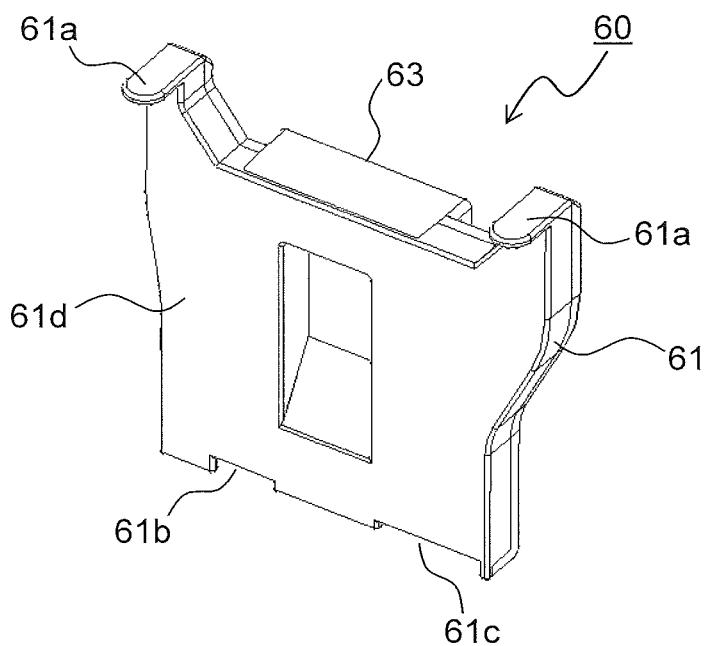
FIG. 7 is a perspective view of an adjustment member as seen from the downstream side in the sheet feeding direction.
Figure 8:
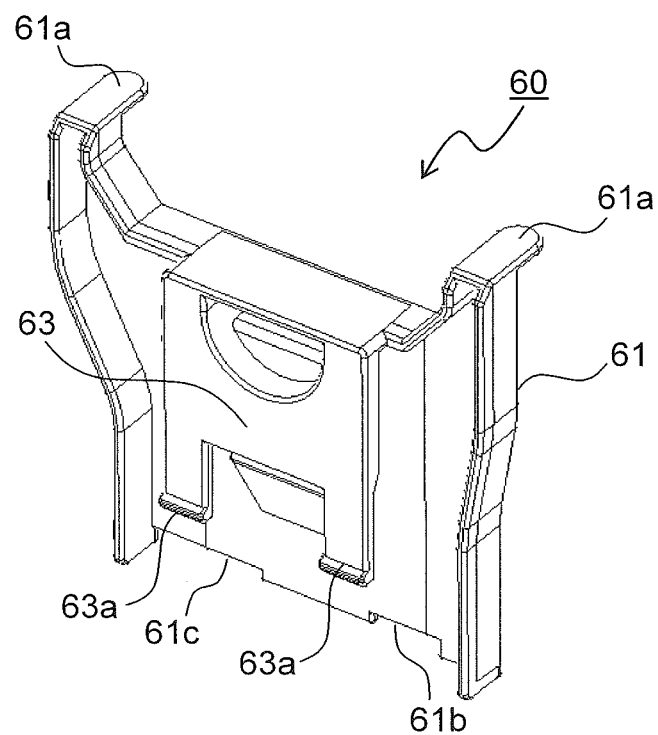
FIG. 8 is a perspective view of the adjustment member as seen from the upstream side in the sheet feeding direction.

FIGS. 7 and 8 are perspective views of the adjustment member 60 as seen, respectively, from the downstream side (the front side) and from the upstream side (the rear side) in the sheet feeding direction. The adjustment member 60 has a second regulating portion 61 and a hook portion 63, and is attachable to and removable from the rear end cursor 31. The second regulating portion 61 forms a second sheet regulating face 61d which touches the rear-end edge of a bundle of sheets stacked on the sheet stacking plate 27 to regulate the rear end of the sheets. The hook portion 63 protrudes from an upper end portion of the second regulating portion 61 in an L shape as seen in a side view across a predetermined interval from the rear face side of the second regulating portion 61.

In an upper end part of the second regulating portion 61, there is formed a second sheet pressing portion 61a that protrudes horizontally toward the downstream side in the sheet feeding direction. When the sheet feeding cassette 10 with a bundle of sheets fully loaded on the sheet stacking plate 27 is inserted, the second sheet pressing portion 61a, like the first sheet pressing portion 41a formed in the rear end cursor 31, regulates the sheets so that they do not go over an upper end of the second regulating portion 61 as a reaction to the insertion. In a lower end part of the second regulating portion 61, there are formed cut-off parts 61b and 61c that respectively engage with the projected portions 43c and 43d formed on the main body portion 43 of the rear end cursor 31.

Next, a procedure for adjusting the position of the rear end cursor 31 when sheets in a size other than standard sizes (a non-standard size) are stored in the sheet feeding cassette 10 will be described. Here, a case where sheets in statement (half letter) size as one example of a non-standard size are stored will be explained.

First, the rear end cursor 31 is adjusted at a place corresponding to the standard size (here, A6 size) that is larger than and closest to the desired non-standard size (here, statement). Specifically, the rear end cursor 31 is moved along the sheet feeding direction such that the size indication arrow 41b (see FIG. 3) of the rear end cursor 31 points the A6 size indicator marked on the bottom face of the cassette base 23. When the rear end cursor 31 is arranged at a position corresponding to the A6 size sheet, the engaging projection 43a (see FIG. 3) on the main body portion 43 engages with the engaging depressed portions 53g (see FIG. 6) formed in the guide portion 51a.

Next, the adjustment member 60 is attached from above the rear end cursor 31. Specifically, the second regulating portion 61 of the adjustment member 60 is laid over the surface of the first regulating portion 41 of the rear end cursor 31, and the hook portion 63 of the adjustment member 60 is inserted between the first regulating portion 41 of the rear end cursor 31 and the operating portion 45a of the cursor lever 45. Then, a claw portion 63a formed at a tip end of the hook portion 63 is hooked on a lower end part of the operating portion 45a to fix the adjustment member 60 to the rear end cursor 31.

Figure 9:
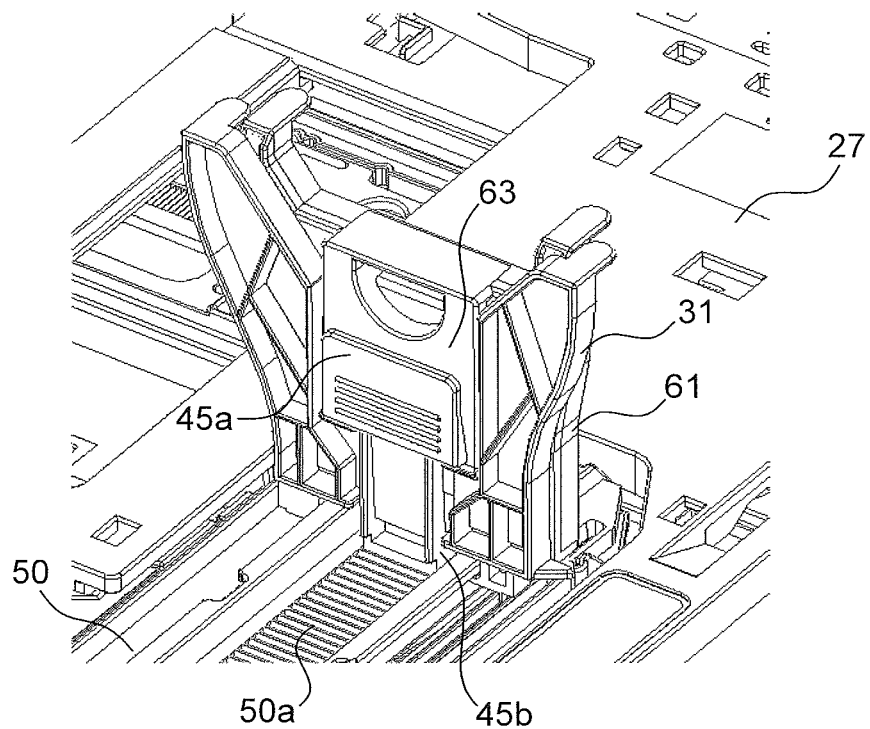
FIG. 9 is a perspective view of the rear end cursor with the adjustment member attached to it as seen from the downstream side in the sheet feeding direction.
Figure 10:
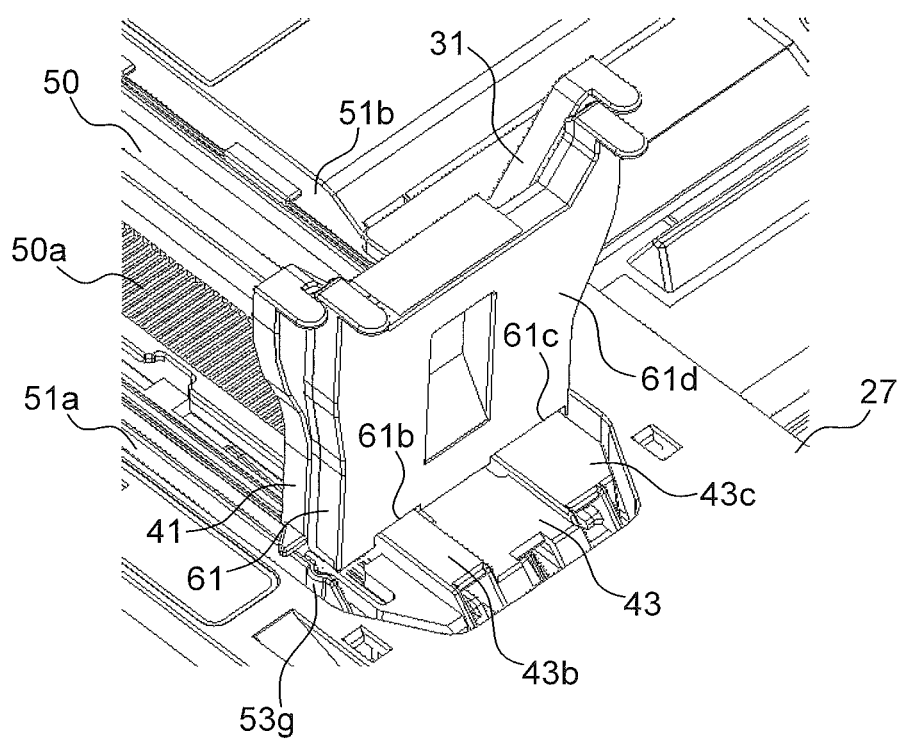
FIG. 10 is a perspective view of the rear end cursor with the adjustment member attached to it as seen from the upstream side in the sheet feeding direction.
Figure 11:
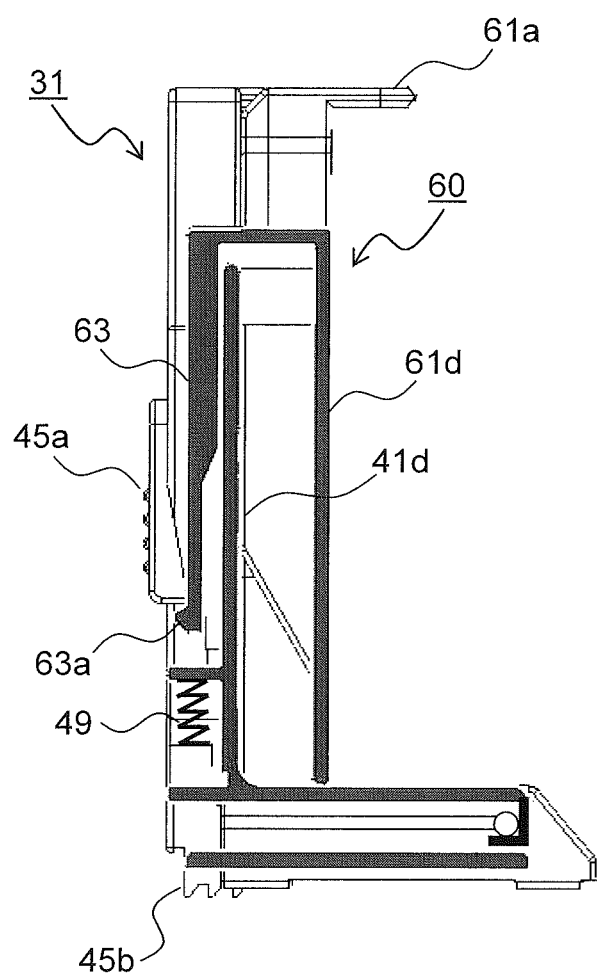
FIG. 11 is a cross-sectional side view of the rear end cursor with the adjustment member attached to it.

FIGS. 9 and 10 are perspective views of the rear end cursor 31 with the adjustment member 60 attached to it as seen, respectively, from the downstream side (the front side) and from the upstream side (the rear side) in the sheet feeding direction, and FIG. 11 is a cross-sectional side view of the rear end cursor 31 with the adjustment member 60 attached to it.

Sheets in A6 size measure 148×105 mm, and sheets in statement size measure 139.7×215.9 mm; thus the difference in the rear end position of the sheets when stored in the sheet feeding cassette 10 is 148−139.7=8.3 mm. Offsetting the difference in the rear end position with the thickness of the second regulating portion 61 of the adjustment member 60 permits sheets in statement size to be stored at an appropriate position. In this embodiment, the thickness of the second regulating portion 61 is set at 7 mm to leave a margin of 1 to 2 mm in the space between the rear end of sheets and the second regulating portion 61.

The hook portion 63 of the adjustment member 60 is inserted between the first regulating portion 41 and the operating portion 45a, and thereby the space (movable region) in which the cursor lever 45 can move is obstructed by the hook portion 63. Accordingly, the cursor lever 45 does not pivot even if the operating portion 45a is pressed, and the engagement between the lock claw 45b and the rack teeth 50a is not released.

According to the above structure, the rear end cursor 31 is adjusted at a position corresponding to a standard size, and then the adjustment member 60 is attached; thereby the first sheet regulating face 41d of the rear end cursor 31 can be offset to the second sheet regulating face 61d according to a non-standard size sheet. With this, the first sheet regulating face 41d of the rear end cursor 31 can be accurately adjusted at a position corresponding to a non-standard size, and this suppresses the occurrence of sheet feeding failure.

Attaching the adjustment member 60 restricts the operation of the cursor lever 45, and this permits the rear end cursor 31 to be reliably fixed. With this, when a bundle of sheets is set, displacement of the rear end cursor 31 is less likely to occur, and erroneous operation of the rear end cursor 31 unintended by a user can also be prevented.

While the above embodiments deal with an example where the regulation position of the rear end cursor 31 arranged at a position corresponding to an A6 size sheet is offset according to a statement size sheet, the regulation position of the rear end cursor 31 can be offset with the adjustment member 60 also according to other non-standard size sheets.

Here, if the size difference between the standard size at which the rear end cursor 31 is arranged and the non-standard size which is offset from the standard size by the adjustment member 60 becomes large, the second regulating portion 61 of the adjustment member 60 needs to be made thicker, and this leads to increases in the size and cost of the adjustment member 60. Thus, it is preferable to use the adjustment member 60 that offsets the first sheet regulating face 41d of the rear end cursor 31 arranged at a position corresponding to the smallest standard size out of the standard sizes larger, in the sheet feeding direction, than the non-standard size to be offset to.

For example, when sheets in K16 size (267×194 mm), which is a non-standard size, are stored, the rear end cursor 31 is adjusted to a position corresponding to a sheet in letter size (279.4×215.9 mm), which is a standard size, to offset the difference in the rear end position of the sheets (279.4−267=12.6 mm) with the second regulating portion 61 of the adjustment member 60. For another example, when sheets in B5 (ISO) size (250×176 mm), which is a non-standard size, are stored, the rear end cursor 31 is adjusted to a position corresponding to a sheet in B5 (JIS) size (257×182 mm), which is a standard size, to offset the difference in the rear end position of the sheets (257−250=7 mm) with the second regulating portion 61 of the adjustment member 60.

A plurality of adjustment members 60 corresponding to a plurality of non-standard sizes as described above are prepared to be attached to the rear end cursor 31 arranged at a position corresponding to a predetermined standard-size sheet. With this, the first sheet regulating face 41d of the rear end cursor 31 can be easily offset to a position (the second sheet regulating face 61d) corresponding to a non-standard size. Accordingly, sheets in various sizes can be stored at appropriate positions in the cassette base 23, and thus the occurrence of sheet feeding failure in the sheet feeding cassette 10 can be effectively suppressed.

Here, for selecting an appropriate adjustment member 60 corresponding to a desired non-standard size, the plurality of adjustment members 60 need to be distinguished. Thus, it is preferable to mark size indicators such as "A6 to statement" or "letter to K16" on the top face or the like of the adjustment member 60.

The embodiment described above is in no way meant to limit the present disclosure, which thus allows for many modifications and variations within the spirit of the present disclosure. For example, the present disclosure is applicable not only to monochrome printers like the one shown in FIG. 1 but also to image forming apparatuses of any other types to which a sheet feeding cassette is attached, such as color printers, monochrome or color copiers, digital multifunction peripherals, and facsimile machines.

The present disclosure is applicable to image forming apparatuses provided with a sheet storing cassette with a cursor member for regulating the rear end of sheets stored in a cassette base. Based on the present disclosure, it is possible to provide a sheet storing cassette with a simple structure with which, even when non-standard size sheets are stored, the cursor member can be easily positioned at an appropriate position, and to provide an image forming apparatus provided with such a sheet storing cassette.

What is claimed is:

1. A sheet storing cassette, comprising:
    a cassette base which can be inserted in and drawn out from an apparatus main body and which stores sheets;
    a sheet stacking plate whose end part on an upstream side in a sheet feeding direction is pivotably supported on a bottom face of the cassette base and on whose top face the sheet is placed;
    a cursor rail which is on the bottom face of the cassette base and which extends along the sheet feeding direction;
    a regulation cursor which is provided movably along the cursor rail, the regulation cursor having an engaging portion and a first regulating portion which forms a first sheet regulating face for positioning the sheet placed on the sheet stacking plate in the sheet feeding direction;
    a plurality of engaged portions which are provided at standard-size positions corresponding to a plurality of standard sheet sizes in the cursor rail to mesh with the engaging portion when the regulation cursor is arranged at one of the standard-size positions; and
    an adjustment member which is attachable to and removable from the regulation cursor and which has a second regulating portion that offsets, when the adjustment member is attached to the regulation cursor arranged at one of the standard-size positions, the first sheet regulating face to a second sheet regulating face corresponding to a non-standard size sheet smaller in the sheet feeding direction than a standard size corresponding to the one of the standard-size positions,
    wherein
    the regulation cursor is provided with a cursor lever which is movable between a locked position in which the cursor lever restricts movement of the regulation cursor with respect to the cursor rail and an unlocked position in which the cursor lever allows the movement of the regulation cursor, and
    the adjustment member, when attached to the regulation cursor, restricts movement of the cursor lever from the locked position to the unlocked position.

2. The sheet storing cassette according to claim 1, wherein the first regulating portion faces an edge, on an upstream side in the sheet feeding direction, of the sheet placed on the sheet stacking plate, and
    the second regulating portion overlaps with the first regulating portion when the adjustment member is attached to the regulation cursor, and thereby the adjustment member offsets, by a length equivalent to a thickness of the second regulating portion, the first sheet regulating face to the second sheet regulating face at a different position in the sheet feeding direction.

3. The sheet storing cassette according to claim 1, wherein the adjustment member has a hook portion which is inserted in a movable region of the cursor lever and which restricts the movement of the cursor lever from the locked position to the unlocked position, and
    a claw portion provided at a tip end of the hook portion meshes with the cursor lever to fix the adjustment member to the regulation cursor.

4. The sheet storing cassette according to claim 1, wherein a sheet pressing portion which protrudes horizontally toward a downstream side in the sheet feeding direction is formed in an upper end part of the adjustment member.

5. The sheet storing cassette according to claim 1, wherein the adjustment member offsets to the second sheet regulating face the first sheet regulating face of the regulation cursor arranged at a position corresponding to a smallest standard size out of standard sizes larger in the sheet feeding direction than the non-standard size.

6. The sheet storing cassette according to claim 1, comprising a plurality of the adjustment members corresponding to the sheets in a plurality of the non-standard sizes,
    wherein
    one of the plurality of adjustment members is selectively fitted to the regulation cursor.

7. The sheet storing cassette according to claim 6, wherein the standard size without offsetting of the first sheet regulating face and the non-standard size with offsetting of the first sheet regulating face to the second sheet regulating face are indicated on each of the adjustment members.

8. An image forming apparatus, comprising:
    the sheet storing cassette according to claim 1; and
    an image forming portion which forms an image on the sheet fed from the sheet storing cassette.

9. A sheet storing cassette, comprising:
    a cassette base which can be inserted in and drawn out from an apparatus main body and which stores sheets;
    a sheet stacking plate whose end part on an upstream side in a sheet feeding direction is pivotably supported on a bottom face of the cassette base and on whose top face the sheet is placed;
    a cursor rail which is on the bottom face of the cassette base and which extends along the sheet feeding direction;
    a regulation cursor which is provided movably along the cursor rail, the regulation cursor having an engaging portion and a first regulating portion which forms a first sheet regulating face for positioning the sheet placed on the sheet stacking plate in the sheet feeding direction;
    a plurality of engaged portions which are provided at standard-size positions corresponding to a plurality of standard sheet sizes in the cursor rail to mesh with the engaging portion when the regulation cursor is arranged at one of the standard-size positions; and
    an adjustment member which is attachable to and removable from the regulation cursor and which has a second regulating portion that offsets, when the adjustment member is attached to the regulation cursor arranged at one of the standard-size positions, the first sheet regulating face to a second sheet regulating face corresponding to a non-standard size sheet smaller in the sheet feeding direction than a standard size corresponding to the one of the standard-size positions, and
a plurality of the adjustment members corresponding to the sheets in a plurality of the non-standard sizes,
wherein
one of the plurality of adjustment members is selectively fitted to the regulation cursor, and
the standard size without offsetting of the first sheet regulating face and the non-standard size with offsetting of the first sheet regulating face to the second sheet regulating face are indicated on each of the adjustment members.

10. A sheet storing cassette, comprising:
a cassette base which can be inserted in and drawn out from an apparatus main body and which stores sheets;
a sheet stacking plate whose end part on an upstream side in a sheet feeding direction is pivotably supported on a bottom face of the cassette base and on whose top face the sheet is placed;
a cursor rail which is on the bottom face of the cassette base and which extends along the sheet feeding direction;
a regulation cursor which is provided movably along the cursor rail, the regulation cursor having an engaging portion and a first regulating portion which forms a first sheet regulating face for positioning the sheet placed on the sheet stacking plate in the sheet feeding direction;
a plurality of engaged portions which are provided at standard-size positions corresponding to a plurality of standard sheet sizes in the cursor rail to mesh with the engaging portion when the regulation cursor is arranged at one of the standard-size positions; and
an adjustment member which is attachable to and removable from the regulation cursor and which has a second regulating portion that offsets, when the adjustment member is attached to the regulation cursor arranged at one of the standard-size positions, the first sheet regulating face to a second sheet regulating face corresponding to a non-standard size sheet smaller in the sheet feeding direction than a standard size corresponding to the one of the standard-size positions,
wherein
a sheet pressing portion which protrudes from the second sheet regulating face horizontally toward a downstream side in the sheet feeding direction is formed in an upper end part of the adjustment member.

* * * * *